(No Model.) 2 Sheets—Sheet 1.

O. MORRILL.
JUMP SEAT CARRIAGE.

No. 278,583. Patented May 29, 1883.

Witnesses:
Chas. S. Gooding.
Eugene Humphrey

Inventor:
Osgood Morrill
per Porter & Hutchinson
Attys

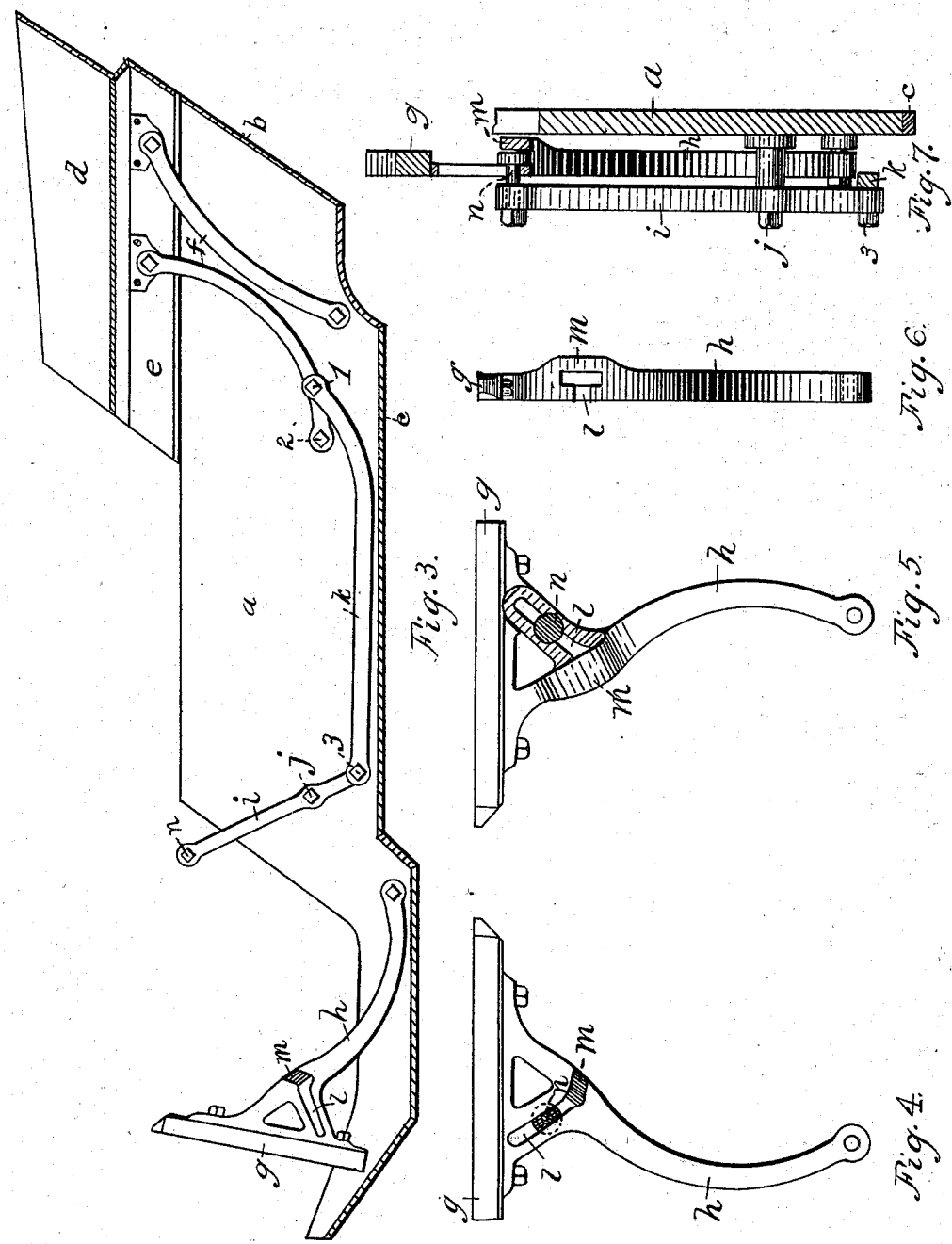

UNITED STATES PATENT OFFICE.

OSGOOD MORRILL, OF SALISBURY, MASSACHUSETTS.

JUMP-SEAT CARRIAGE.

SPECIFICATION forming part of Letters Patent No. 278,583, dated May 29, 1883.

Application filed April 2, 1883. (No model.)

*To all whom it may concern:*

Be it known that I, OSGOOD MORRILL, of Salisbury, in the county of Essex and State of Massachusetts, have invented a new and useful Improvement in Jump-Seat Carriages, which will, in connection with the accompanying drawings, be hereinafter fully described, and specifically defined in the appended claims.

This invention has for its object, in addition to means or devices by which the front seat can be automatically raised or lowered through and by the act of jumping the rear seat backward or forward in the usual and well-known manner, the movement of the front seat by means whereby said seat can when raised in position for use be instantly turned down by swinging it forward upon the pivots on which its sustaining-standards are supported, in order to allow ingress to or egress from the carriage by the occupants of the rear seat, without passing into or out of the vehicle between the seats at the side of the carriage; and the invention consists in the peculiar means and method by which the pivotal supporting-standards of the front seat are connected with the devices whereby the front seat is automatically lowered and raised by the jumping of the rear seat.

Figure 1:
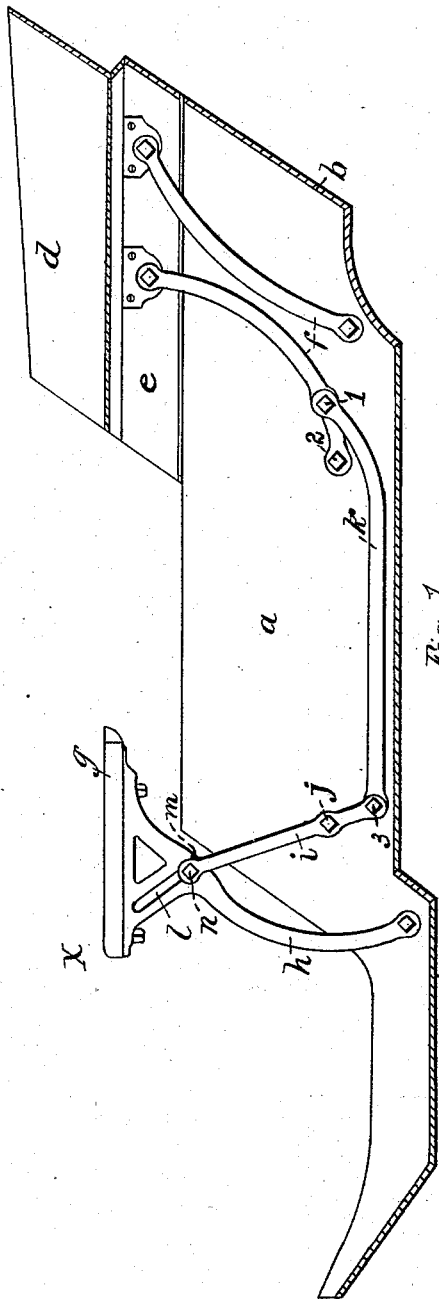
Figure 2:
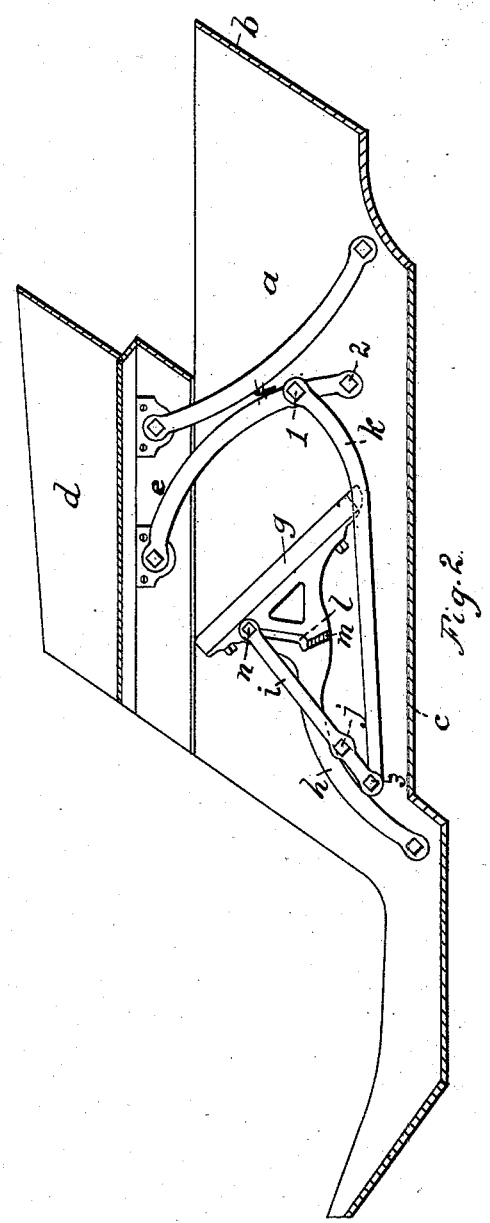

Figure 1 is a sectional elevation, showing my improved jumping-irons as applied to the right-hand side of the body, the floor, seat, and back panel being shown in longitudinal vertical section, and both seats being shown in position for use. Fig. 2 is a view like Fig. 1, except that the rear seat is shown as jumped forward and the front seat is shown as turned down beneath the rear seat. Fig. 3 is a view like Fig. 1, except that the front seat is shown as tipped forward to allow the occupants of the rear seat to pass into or out of the vehicle at the front, where the side panel is "cut down." Fig. 4 is an enlarged detached elevation of the front-seat standard viewed as in the three preceding figures, the wrist-pin of the vibrating bar that actuates said standard being shown in transverse section and in place in the slot in the standard. Fig. 5 is a reverse view of Fig. 4. Fig. 6 is a rearward elevation of the front-seat standard. Fig. 7 is a transverse section taken as on line *x x*, Fig. 1, and viewed as from the right in said figure.

The several devices shown in the views are in the usual manner duplicated at each side of the carriage-body; and in said views *a* represents the side of the body. *b* is the rear of the body, of the same height as *a*, and *c* is the floor, said side *a* being in the common manner cut down at its front portion to admit of easy access to and exit from the seats. The rear seat, *d*, is shown as provided with the usual base, *e*, resting upon side *a*, and as attached to said side by the jumping-irons *f*, pivotally connected at their respective ends with side *a* and base *e*. The front seat, *g*, is rigidly secured to the top of standard *h*, which at its lower end is pivotally connected with side *a*; and *i* is a pivotal bar mounted and vibrating on pivot *j*, and connected with the front iron, *f*, by connecting-rod *k*, which is at its ends respectively pivoted to said bar and iron, as shown. Said bar *i* and standard *h* are formed and arranged to be connected and disconnected, as follows: In the upper portion of the standard I form the slot *l*, as shown—that is, with its lower portion parallel, or nearly so, with seat *g*, while its upper portion is at an angle of about forty-five degrees with said seat, a short vertical line occurring at the junction of said two parts of the slot, said slot being open at its lower or rear extremity—that is, it extends to the rearward edge of the standard, as shown, and it extends through the transverse dimension of the standard, with the exception of the re-enforce or enlargement *m*, which serves to strengthen the standard by bridging across the lower portion of the slot, as shown in Figs. 4 to 7. In the upper end of pivotal bar *i* is formed or secured a wrist-pin, *n*, formed to freely enter and traverse said slot *l* when moved therein, as is clearly shown in the several figures. When both seats are in position for use, as shown in Fig. 1, wrist-pin *n* is at the bottom of slot *l*, as shown in said figure; but when seat *d* is jumped forward, the action of rod *k* upon bar *i* serves to move seat *g* backward, whereby pin *n* is moved farther into slot *l*, and so folds seat *g* downward, as shown in Fig. 2; and when the seats are both in position for use, as stated, and the occupants of the rear seat desire to enter or leave the carriage, seat *g* can be instantly tipped forward, as shown in Fig. 3, thereby allowing a passage for such occupants of the rear seat. To reconnect the front seat with rod $i$ it is only necessary to raise the seat, when its slots will encounter the wrist-pins $n$, and they will enter said slots to the point of intersection of the horizontal and oblique sections thereof, when the seat is thereby held from further rearward movement. By means of the forward tilting of seat $g$ to allow exit or ingress of the rear-seat passengers at the cut-down at the front of the body, a high side to the body without a cut-down or door between the seats is rendered feasible. Pivot 1 at the rear end of rod $k$ should be in line with pivots 2 and 3, as shown, for the desired working of the several parts. By connecting rod $k$ with the rear iron, $f$, instead of the front one, as shown, a more prompt action of the front seat is effected when the rear seat is jumped forward, and by such arrangement the front seat will be folded back a greater distance than if rod $k$ were connected with the front iron, $f$. The jumping-irons $f$, connecting-bar $k$, pivotal bar $i$, and a slotted standard, $h$, connected with said bar, are not herein broadly claimed as new, as they are shown in a former application for Letters Patent filed by myself, which was allowed March 6, 1883, my present invention being confined to the standard $h$, formed with a rearwardly-open slot to receive the wrist-pin of bar $i$, and to the combination, with a rear jump-seat, of a front seat arranged to tilt or turn down by both a rearward and forward movement.

Hence I claim as my invention—

1. In a jump-seat carriage, the combination, with pivotal bar $i$, rod $k$, and jumping-iron $f$, arranged to operate substantially as described, of standard $h$, formed with slot $l$, open at the rear of said standard to receive pin $n$ of bar $i$, to actuate said seat, as set forth, whereby seat $g$ is automatically raised and lowered by the jumping of the rear seat, and can be tilted forward free from bar $i$, or rearward to re-engage said bar, as and for the purposes specified.

2. In a jump-seat carriage, the combination, with the rear seat and the jumping and tilting devices, whereby the jumping of the rear seat will automatically raise and lower the front seat, of a front seat mounted on a pivotal standard, and arranged to be tilted forward after it is so automatically raised, independently of the automatic devices by which it is raised and lowered, and to be by such forward tilting disconnected from said raising and lowering devices without deranging or displacing the same, substantially as specified.

OSGOOD MORRILL.

Witnesses:
N. B. SARGENT,
GEO. WOODS.